United States Patent [19]

Gwyn

[11] 4,405,440
[45] Sep. 20, 1983

[54] PROCESS FOR MAINTAINING THE TEMPERATURE OF A STEAM-MAKING EFFLUENT ABOVE THE DEW POINT

[75] Inventor: John E. Gwyn, Katy, Tex.
[73] Assignee: Shell Oil Company, Houston, Tex.
[21] Appl. No.: 443,369
[22] Filed: Nov. 22, 1982
[51] Int. Cl.³ ............................ C10G 9/16; C10G 9/20
[52] U.S. Cl. ................................ 208/48 Q; 165/146; 165/147; 208/130; 585/950; 585/648
[58] Field of Search ............ 208/48 Q, 130; 585/950, 585/648; 165/135, 146, 147

[56] References Cited

U.S. PATENT DOCUMENTS

| | | | |
|---|---|---|---|
| 1,657,202 | 1/1928 | Ellyson | 165/147 |
| 2,018,163 | 10/1935 | Wells | 165/147 |
| 3,527,832 | 9/1970 | Pamphilis et al. | 208/130 |

*Primary Examiner*—Delbert E. Gantz
*Assistant Examiner*—Anthony McFarlane
*Attorney, Agent, or Firm*—Albert J. Adamcik

[57] ABSTRACT

A process of quenching an effluent containing materials having a tendency to coke is disclosed, the process being characterized by the quenching of the effluent in a quench zone wherein heat is transferred from the effluent through at least one heat exchange tube wall, and through a solid heat transfer medium surrounding the tube and in contact with the tube, to water, the temperature of the wall being maintained above the dew point of materials having a tendency to coke partly by the provision of the solid heat transfer medium which increases gradually in thickness from a point at or near the entry of the tube to a point at or near the exit of the tube.

3 Claims, 2 Drawing Figures

PROCESS FOR MAINTAINING THE TEMPERATURE OF A STEAM-MAKING EFFLUENT ABOVE THE DEW POINT

BACKGROUND OF THE INVENTION

Pyrolysis of a liquid hydrocarbon material is a well-known process that involves heating the material to a temperature that is high enough to cause thermal decomposition of larger molecules to form smaller molecules. Pyrolysis may be accomplished with a diluent, such as steam, to produce more favorable product distribution. A pyrolysis process produces a highly unsaturated and very unstable product, hereinafter called the effluent from the pyrolysis process, or simply the effluent.

The effluent is usually rich in olefins, diolefins, acetylenes and other highly unstable compounds, and there is a strong tendency for these materials to react to form high molecular weight products which may be identified collectively as coke or tar. Such products are not desirable and to avoid forming them it is essential to reduce the temperature of the effluent quickly to a stable temperature, that is to a temperature that is so low that rapid reactions of unstable compounds with each other do not take place.

Not withstanding efforts to prevent the condensation and collection of such materials, "coking" of quench units remains a problem which requires regular off-stream time for "de-coking". The invention addresses this problem.

SUMMARY OF THE INVENTION

Accordingly, the invention relates to a process for quenching effluent containing materials having a tendency to coke, in which an process the effluent is quenched in a quench zone wherein heat is transferred through at least one heat exchange tube wall and through, a solid heat transfer medium surrounding and in contact with the wall, to water, the heat transfer medium increasing gradually in thickness from a point at or near the entry of the tube to a point at or near the exit of the tube. As indicated, the effluent treated is preferably an effluent from a pyrolysis zone wherein a hydrocarbon liquid is pyrolyzed at a temperature of from about 1000° F. to 1475° F.

Although the invention is adaptable to the treatment of pyrolysis product effluents of any hydrocarbon material, it is particularly suited for utilization with effluents produced from heavier hydrocarbon material. Preferred feedstocks include gas oil and pitch. The particular procedure employed in the pyrolysis of the hydrocarbon feed forms no part of the invention, and any suitable method that produces a high temperature effluent may be employed. In general, the temperature of the effluent from such pyrolysis units will normally exceed 1400° F., and will range from about 1400° F. to 1700° F. Temperatures on the order of from about 1435° F. to 1475° F. are common for pyrolysis of gas oils in conventional units, and temperatures of 1500° F. to 1700° F. are employed for high temperature, short contact time pyrolysis.

Mechanically, the limited surface tubular heat exchanger represents the most suitable design for the practice of the invention. According to the invention, the design is preferably one of two configurations, a double pipe exchanger (for each pyrolysis furnace tube or zone) or tubes in shell (a number of tubes, e.g., 20, for each pyrolysis or furnace tube).

The key to the invention resides in keeping the process side wall or skin temperature of the heat exchange tube(s) above the dew point of the materials having a tendency to coke or deposit. This dew point, of course, depends on the nature of the feedstock and the materials produced, and thus cannot be given with precision. Preferably, the water side is operated at a temperature and pressure sufficient to keep the water in a boiling condition. In order to achieve these conditions, the water side of the tube or tubes, according to the invention, is "insulated" or covered with a heat transfer medium of controlled thickness, the thickness being very small at or near the entrance to the tube(s), and increasing gradually or uniformly to a point at or near the end of the tube(s).

Because of the many variables involved, such as effluent and water temperature, wall thickness and transfer characteristics, and tube "insulation" and effluent compositions, precise limits for the thickness of the "insulation" cannot be given. What is required is that the thickness of the solid heat transfer medium be gradually increased along the length of the tube(s) to such extent that, in combination with, for example, the variables mentioned, the temperature of the process side wall of the tube or tubes(s) does not reach or go below the dew point of materials in the effluent having a tendency to coke. Those skilled in the art, given these requirements, as well as the design illustrated herein, may readily achieve proper dimensions for the heat transfer medium.

The composition of the "insulating" or reduced transfer heat transfer medium is widely variable. Any suitable solid material which may be fitted, molded, and joined to the tube or tubes may be employed. For example, "moss" or sponge metals, sintered stainless steels, ceramic or masonry materials, such as fused aluminum oxide or silica, or powders of aluminum oxide or silica, sheaved by metal sheet, may be employed. Given the requirements mentioned herein, those skilled in the art may select materials suitable for use.

In order to describe the invention more fully, reference is made to the accompanying schematic drawing.

FIG. 1 illustrates the pyrolysis procedure of the invention, while

Figure 1:
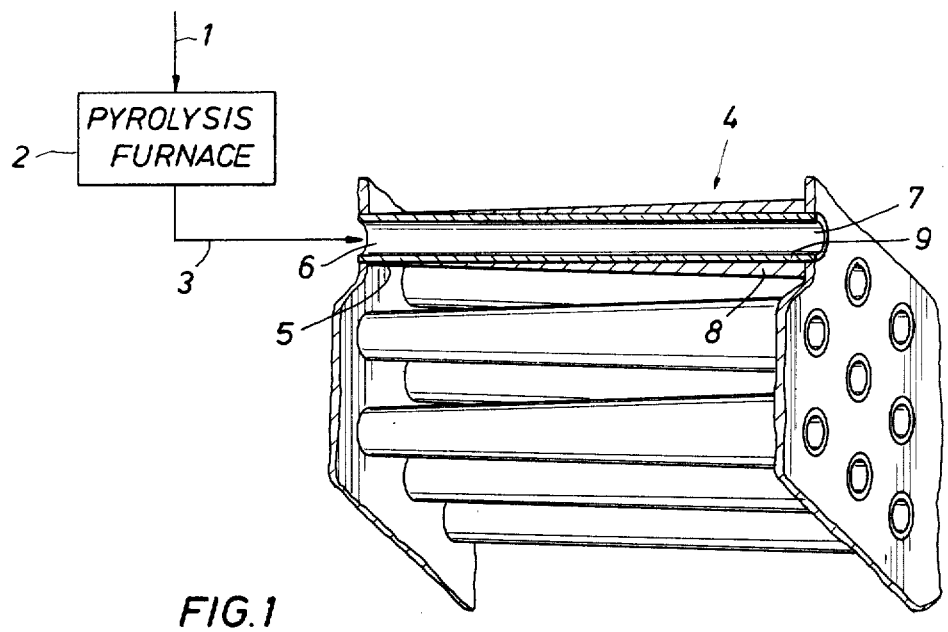

Gas oil is fed via line (1) into a high temperature pyrolysis zone (2) and thermally cracked to form an effluent containing olefins and materials having a tendency to coke. Temperatures in the cracking unit (2) will range from 1000° F. to 1475° F. and will produce an effluent leaving the reaction zone having a temperature of from 1435° F. to 1475° F. The effluent is passed via insulated duct or line (3) into quench zone (4). Quench zone (4) is a multi tube exchanger, say five exchangers per furnace each having, e.g., 48 tubes, each 20 feet long surrounded by boiling water for heat exchange, as shown. For simplicity, only one tube (5), with inlet (6) and outlet (7), is shown, although the other tubes are modified, as described herein. The effluent enters at (6), and is quenched to a temperature of 900° F., leaving via opening (7). An insulating, gradually increasing thickness layer (8) surrounds tube (5) and maintains the inner wall surface (9) of tube (5) above the dew point of materials having a tendency to coke.

Figure 2:
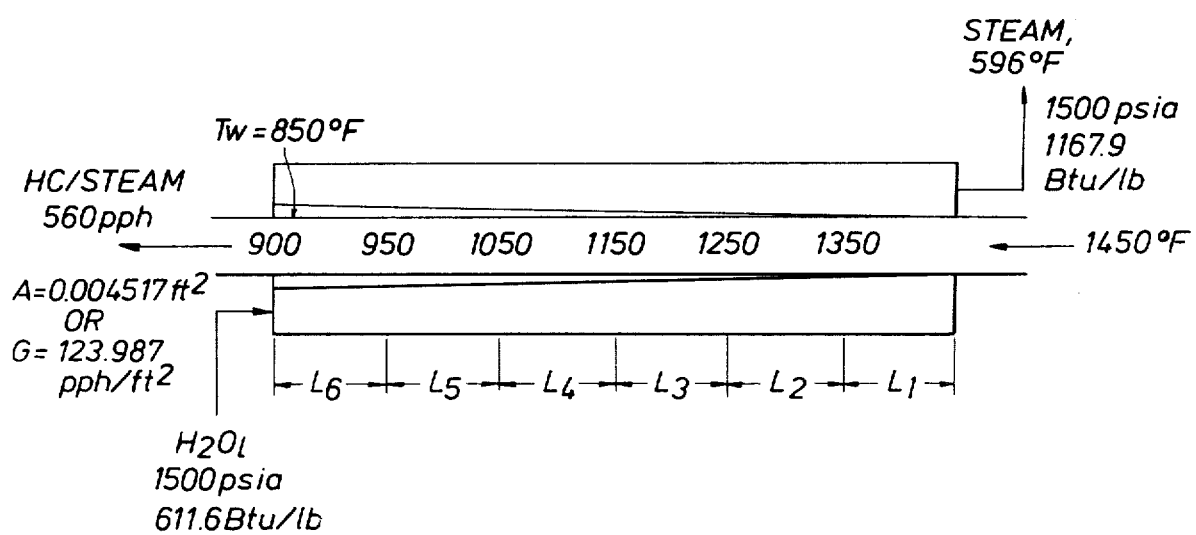
FIG. 2 illustrates different process variables applied to that concept. The values selected are exemplary or calculated.

FIG. 2 illustrates a tube useful in a tube(s) in shell unit, e.g., containing 48 tubes, and shows the temperature distribution along such a tube. Assumptions are as shown in the tables below:

TABLE 1

| $T_w = 850°$ F. | L6 | L5 | L4 | L3 | L2 | L1 |
|---|---|---|---|---|---|---|
| Avg. T process of Section of FIG. 2 | 925 | 1000 | 1100 | 1200 | 1300 | 1400 |
| $C_{pi}$, Btu/lb./°F. | .634 | .645 | .662 | .676 | .692 | .707 |
| $\mu_i$, centipoise | .0200 | .0209 | .0220 | .0232 | .0263 | .0290 |
| Nu = hd/K | 368.2 | 355.8 | 345.4 | 328.1 | 297.4 | 273.4 |
| K, Btu/hr/°F./ft/ft² | .0402 | .0428 | .0460 | .0501 | .0580 | .0662 |
| h, Btu/hr/°F./ft² | 195.2 | 200.8 | 209.5 | 216.8 | 227.5 | 238.7 |
| ΔH, Btu/hr | 17,752 | 36,120 | 37,072 | 37,856 | 38,752 | 39,592[1] |
| $T_w$, °F. | 850 | 850 | 850 | 850 | 850 | 851.5 |
| $\Delta T_{in}$ °F. | 100 | 200 | 300 | 400 | 500 | — |
| $\Delta T_{out}$, °F. | 50 | 100 | 200 | 300 | 400 | — |
| lm, ΔT | 72.1 | 144.3 | 246.6 | 347.6 | 448.1 | 548.5 |
| $A_{zi}$, ft² | 1.2613 | 1.2466 | .71758 | .50234 | .38013 | .30241 |
| $Z_i = \dfrac{A_{zi}}{0.2382}$, ft | 5.30' | 5.23' | 3.01' | 2.11' | 1.60' | 1.27' |
| $T_{ws}$, °F. | 625 | 625 | 625 | 625 | 630 | 630 |
| $K_i/\Delta R$ Insul. | 70.0 | 164.7 | 375.5 | 773 | 2146 | ∞ |
| ΔR" for $K_i$ = 0.93 | .16" | .068" | .030" | .014" | .005" | 0 |
| H₂O vaporized, pph | 31.9 | 64.9 | 66.6 | 68.0 | 69.7 | 71.2[2] |

[1] 207144 Btu/hr × 240 tubes = 49.715 × 10⁶ Btu/hr/furnace
[2] 372.3 × 240 = 89350 pph/furnace Assumptions:

1.40" O.D.
(0.2382 ft²/ft) 0.91" I.D.

$$\Delta R = 0.02042 \quad \frac{K}{\Delta R} = \frac{12.07}{0.02042} = 591$$

$Z_i$ = Length of section $L_i$

For 750° F. Min. Skin Temperature (0.91"ID) $\dfrac{K_{mp}}{\Delta R} = 591$

| | | | | | | | |
|---|---|---|---|---|---|---|---|
| $T_{avg}$, °F. | 825 | 900 | 1000 | 1100 | 1200 | 1300 | 1400 |
| $C_{pi}$ | .622 | .631 | .645 | .662 | .676 | .692 | .707 |
| $\mu_i$ | .0187 | .0197 | .0209 | .0220 | .0232 | .0263 | .0290 |
| Nu | 375 | 367 | 355.8 | 345.4 | 328.1 | 297.4 | 273.4 |
| K | .0380 | .0400 | .0428 | .0460 | .0501 | .0580 | .0662 |
| h | 187.9 | 193.6 | 200.8 | 209.5 | 216.8 | 227.5 | 238.7 |
| ΔH, Btu/hr | 17416 | 35336 | 36120 | 37072 | 37856 | 38752 | 39592[1] |
| $T_w$, °F. | 750 | 750 | 750 | 750 | 779.3 | 816.2 | 851.5 |
| $\Delta T_{in}$, °F. | 100 | 200 | 300 | 400 | — | — | — |
| $\Delta T_{out}$, °F. | 50 | 100 | 200 | 300 | — | — | — |
| lm ΔT | 72.1 | 144.3 | 246.6 | 347.6 | 420.7 | 483.8 | 548.5 |
| $A_{zi}$ | 1.2855 | 1.2649 | .72944 | .50908 | .41507 | .35210 | .30241 |
| $Z_i = \dfrac{A_{zi}}{0.2382}$ | 5.40' | 5.31' | 3.06' | 2.14' | 1.74' | 1.48' | 1.27' |
| $T_{ws}$, °F. | 625 | 625 | 625 | 625 | 625 | 630 | 630 |
| $K_i/\Delta R$ Insul. | 132.7 | 359.4 | 1201 | 40854 | ∞ | ∞ | ∞ |
| ΔR" for $K_i$ = 0.93 | .084" | .031" | .009" | .0003" | 0 | 0 | 0 |
| H₂O vaporized, pph | 31.3 | 63.5 | 64.9 | 66.6 | 68.0 | 69.7 | 71.2[2] |

[1] 242144 Btu/hr × 240 tubes = 58.11 × 10⁶ Btu/hr/furnace
[2] 435.2 × 240 = 104450 pph/furnace

What is claimed is:

1. A process of quenching an effluent containing materials having a tendency to coke comprising,
    passing said effluent into and through a quench zone wherein heat is transferred from the effluent through at least one heat exchange tube wall, and through a solid heat transfer medium surrounding the tube and in contact with the tube, to water, the temperature of the wall being maintained above the dew point of materials having a tendency to coke partly by the provision of the solid heat transfer medium, the heat transfer medium increasing gradually in thickness from a point at or near the entry of the tube to a point at or near the exit of the tube.

2. A process for the pyrolysis of a hydrocarbon liquid comprising,
    heating the hydrocarbon liquid in a pyrolysis zone and producing an effluent having a temperature of from about 1400° F. to about 1700° F.;
    quenching said effluent by passing said effluent into a quench zone wherein heat is transferred indirectly from the effluent through at least one heat exchange tube wall and through a solid heat transfer medium surrounding and in contact with the tube to water, the temperature of the wall being maintained above the dew point of the materials having a tendency to coke in the effluent partly by the provision of the solid heat transfer medium, the heat transfer medium increasing gradually in thickness from a point at or near the entry of the tube to a point at or near the exit of the tube.

3. The process of claim 2 wherein the hydrocarbon liquid is gas oil.

* * * * *